United States Patent [19]

Lucas

[11] Patent Number: 5,000,305
[45] Date of Patent: Mar. 19, 1991

[54] TRANSFER AND ORIENTATING DEVICE FOR BATCHWISE ARRANGED FLAT OBJECTS

[75] Inventor: Raymond Lucas, Villandraut, France

[73] Assignee: Bobst SA, Switzerland

[21] Appl. No.: 422,575

[22] Filed: Oct. 17, 1989

[30] Foreign Application Priority Data

Oct. 17, 1988 [FR] France .................. 88 14303

[51] Int. Cl.$^5$ .............................................. B65G 47/24
[52] U.S. Cl. ................................... 198/414; 198/782; 198/787; 198/790
[58] Field of Search ............... 198/414, 787, 789, 790, 198/782; 193/35 MD; 244/137.1

[56] References Cited

U.S. PATENT DOCUMENTS

| | | |
|---|---|---|
| 495,683 | 4/1893 | Rigby .................................. 198/414 |
| 2,897,948 | 8/1959 | Cranston, Jr. . |
| 3,442,410 | 5/1969 | Solomonson . |
| 3,828,917 | 8/1974 | Oestergren . |
| 4,456,116 | 6/1984 | Jarman ................................ 198/414 |
| 4,519,493 | 5/1985 | Dyer .................................... 198/414 |
| 4,852,721 | 8/1989 | Stille .................................... 198/782 |

FOREIGN PATENT DOCUMENTS

| | | | |
|---|---|---|---|
| 2261936 | 12/1972 | Fed. Rep. of Germany ...... 198/790 |
| 0155156 | 5/1982 | Fed. Rep. of Germany ...... 198/414 |
| 3436468 | 4/1986 | Fed. Rep. of Germany ...... 198/414 |
| 2196598 | 5/1988 | United Kingdom ................ 198/414 |

Primary Examiner—D. Glenn Dayoan
Attorney, Agent, or Firm—Hill, Van Santen, Steadman & Simpson

[57] ABSTRACT

A device including a ball carrier table having an opening in it scenter provided with a turntray with driven carrier balls is used to change the orientation of an article, such as a stack of sheets of boards. The carrier balls are driven by an arrangement including one or more continuous belts having an upper surface engaging a lower part of each of the carrier balls. The motion of the turntray is obtained by an arrangement for rotating the turntray around an axis extending peripendicular to a plane of the table and the turntray can be shifted vertically between a lower position in the plane of the table to an upper position raised above the plane of the table.

8 Claims, 7 Drawing Sheets

TRANSFER AND ORIENTATING DEVICE FOR BATCHWISE ARRANGED FLAT OBJECTS

BACKGROUND OF THE INVENTION

The present invention is directed to an arrangement or device for controlling the transfer and orientation of batchwise arranged flat objects, such as blanks cut from a solid or corrugated board and piled on one another. The device includes a transfer and orientation plane including a tray with driven carrier balls, and the tray is equipped with a lifting device.

In the field of handling stacked or unstacked plate-like material, devices for orientating and carrying such objects are already known.

U.S. Pat. No. 3,828,917 discloses a device which includes a fixed table equipped with carrier balls. Each of these balls is individually driven by a friction drive unit including a disk mounted on a shaft having a pulley which pulley is driven or rotated by toothed belts. The units consisting of the disk and pulley are permanently assembled on a base plate which can be shifted lengthwise and crosswise by means of two jacks or a piston and cylinder arrangement relative to the fixed table. Such a shifting involving the base plate with regard to the fixed table can cause a variation in the speed of rotation of the carrier balls or also a change in their direction of rotation. These changes will allow an orientation of a pile of objects in a desired direction. An appropriate movement of the base plate will allow a pivoting of a pile of objects around its own axis.

U.S. Pat. No. 3,442,410 discloses another device for orientating a batch of objects. The device of this patent includes an assembly which has several endless belt conveyors between which is fitted a cross-shaped table which is mounted on a shaft which can be rotated in alternating directions, as controlled by two pneumatic pistons. Moreover, this table is fitted in a cradle which is connected to two pneumatic pistons arranged to shift it in a vertical direction so that the table can lift an object above the plane of the endless belt conveyors. Thus, by shifting the table in the vertical direction and also rotating it on its shaft, the orientation of an object can be changed prior to be continuously conveyed on the belts of the device.

A third device for orientating pilewise or batchwise arranged objects is disclosed in U.S. Pat. No. 2,897,948, which is similar to the above-mentioned devices. In particular, this device includes a conveyor arrangement of conveying rollers positioned between two conveying belts. A table having apertures for receiving the rollers is mounted for both rotation and for lifting between a lower position with the rollers extending through the apertures of the table to an upper position with the table positioned above the rollers. In this particular arrangement, the table is rotated in a single direction, with the rotation being intermittent and through a 90° angle. The raising of the table is obtained by a lever acting on a disk connected to a support shaft for the table.

Each of the above-mentioned devices, however, has certain drawbacks. For example, in the device of the first-mentioned patent, U.S. Pat. No. 3,828,917, the rotary ball motion requires a relatively complicated arrangement for each ball which is expected to be controlled. Moreover, the translation of the base plate relative to the table requires a separate control which is equally expensive to make. Besides that, the device does not allow for the disengagement of the balls from the load, which is represented by the weight of the object to be carried or reorientated, and the space between the various balls should be rather large, which design, as it might happen with the processing of relatively delicate materials, involves a considerable local load on the contact points between the balls and the lowermost sheet of the pile.

The device, which is disclosed by U.S. Pat. No. 3,442,410, is not provided with balls, but with belts for creating the conveyance of the objects and the inversion of the batches of such objects can only be achieved if the cross-shaped table occupies its upper position with regard to the plane represented by the endless belts of the conveyor In this execution and with regard to the cross-shaped table, there occurs a rotary movement, either backwards or forwards, accomplished jointly with the alternating vertical movement of the cross-shaped table. Both movements are created by pneumatic or hydraulic jacks. The design of this assembly requires the use of important means with a view to obtain a simple inversion of the object. Moreover, this device allows only one inversion of the object. There is no possibility to orient and, therefore, to direct the object toward different trajectories as this might be feasible with the first device, which was described hereinabove.

The third device of U.S. Pat. No. 2,897,948 has a design similar to that of the second device. In fact, it differs only by the configuration of the inverting table, which is actually rectangular and has apertures enabling the passage of an upper portion or part of each of the conveyor rollers when the table is in its lower position. In this execution, which also enables the rotation of the batches of objects only when the table is in its upper position, the rotary table drive has not been conceived in such a way as to impart an alternating movement, but rather only imparts an actual sequential movement, always in the same direction of rotation by means of a motor, whose electrical controls include a rod fitted to the table axis. The vertical movement is controlled by means of a device which includes a lever operated by a jack.

The shortcomings of these devices are the same as those already referred to in connection with the earlier-described devices.

SUMMARY OF THE INVENTION

The present invention is proposed to remedy the above-mentioned shortcomings. To this aim, the invention consists of an improvement in a device which insures the transfer and orientation of flat objects arranged batchwise, such as blanks cut from a solid or corrugated board and then stacked on one another.

The device includes a transfer and orientation plane which consists of a carrier ball table surrounding a turntray or turntable, means for supporting the turntray by a central bearing in the ball table, the turntray having a circular shape and being carried by a supporting element in such a way that its plane will be aligned with the plane represented by the carrier ball table, means for rotating the turntray consisting of a rotary drive device controlled, as required by the orientation wanted for the object to be processed, means for driving the carrier balls consisting of at least one laterally shifting member arranged underneath the transfer and orientation plane and having an upper surface for contacting the lower part of the carrier balls in the carrier ball table and with the lower part of the carrier balls of the turntray, means for vertically shifting the turntray consist of at least a jack controlled, as required by the size of the object to be processed, the jack being fitted between a lower chase of the device and a pad carried on brackets connected to the turntray, and each of the carrier balls of the carrier ball tray and turntray are inserted into guide members disposed on the tray and turntable.

The advantages obtained with this invention essentially consist in that the appropriate control of the means for driving the balls of the turntray and of the carrier balls of the table, as well as the means for driving the rotating tray enable, on the one hand, any orientation of the object processed when the latter has a maximum size contained within the perimeters of the turntray circumference, as well as the processing of objects with a size larger than the diameter of the turntray by raising the tray in order to prevent unwanted rubbing of the outer edges of the object on the carrier ball table when the tray rotates. Summing up, the device distinguishes itself by the increased transfer and orientation speed of the object which, thus, enables an increase of the production speed of an installation provided with the device. The mechanical elements, which are utilized for making such a device, are of a simple design so that the costs of the device are obviously much lower than those of existing devices.

Other advantages and features of the invention will be readily apparent from the following description of the preferred embodiments, the drawings and claims.

DESCRIPTION OF THE PREFERRED EMBODIMENTS

Figure 1:
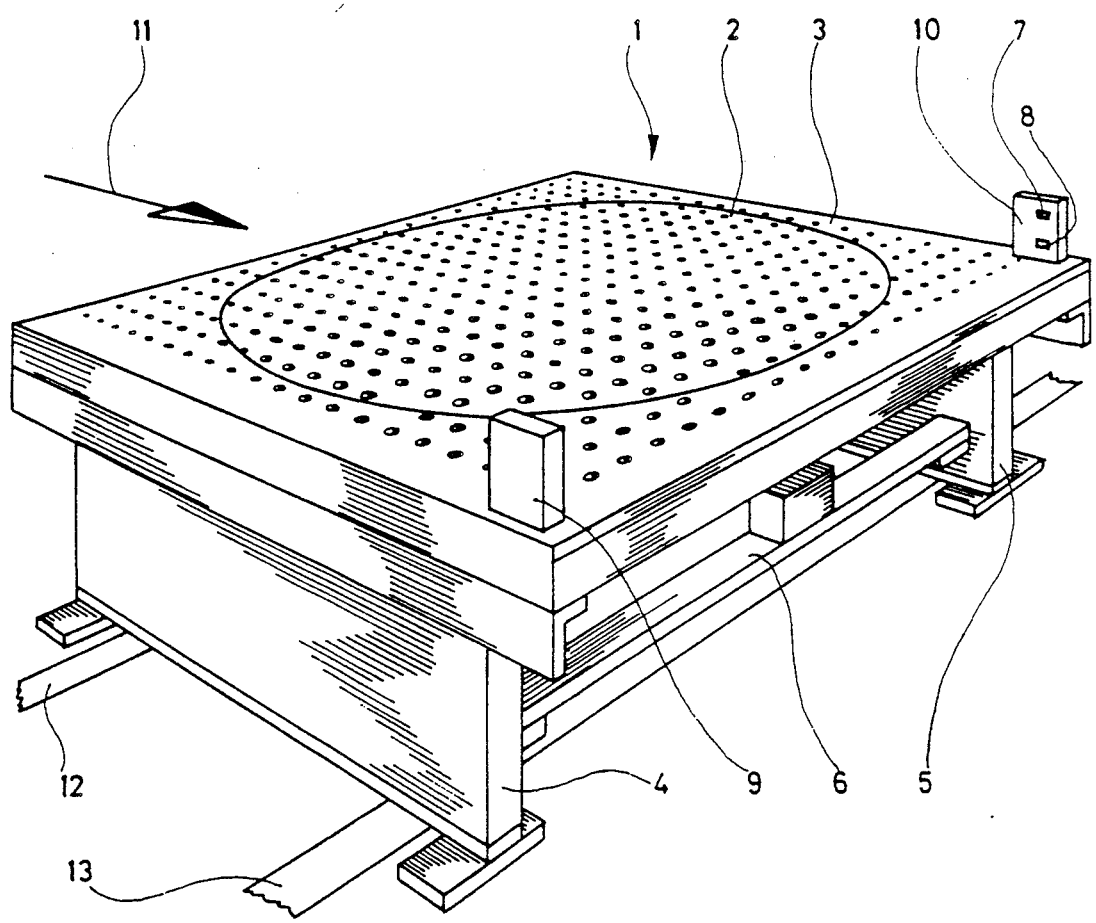
FIG. 1 is a perspective view of a transfer and orientating device according to the present invention.

The principles of the present invention are particularly useful when incorporated in a transfer and orientation device, generally indicated at 1 in FIG. 1. As illustrated in FIG. 1, the device 1 includes a turntray or turntable 2 which is arranged in the center of a carrier ball table 3. The table 3 as well as the turntable or turntray 2 are supported by two lateral frame members 4 and 5, which are connected to one another by struts or cross members 6 of which only one is visible in FIG. 1. The arrangement of the struts and of the elements for controlling the movement of the turntray 2 will be illustrated in greater detail in FIGS. 3 and 4.

As may be gathered from the description set forth hereinafter, the turntray or turntable 2 is not only driven in a rotary direction, but can also be raised with regard to the plane represented by the carrier ball table 3. The rotary drive, as well as the raising of the turntable 2, is commanded by photocells, such as 7 and 8, on supports 9 and 10, which are located at one of the ends of the carrier ball table 3, preferably in the area where the piles of objects to be processed will be discharged. The piles are moved, preferably, in the direction shown by the arrow 11. Attention is to be drawn to the fact that with the present execution, the transfer and orientation device has been arranged so as to be able to be moved on rails 12 and 13, which have been previously provided in the floor of the room containing the processing line for producing the blanks of which the device 1 cooperates with.

Figure 2:
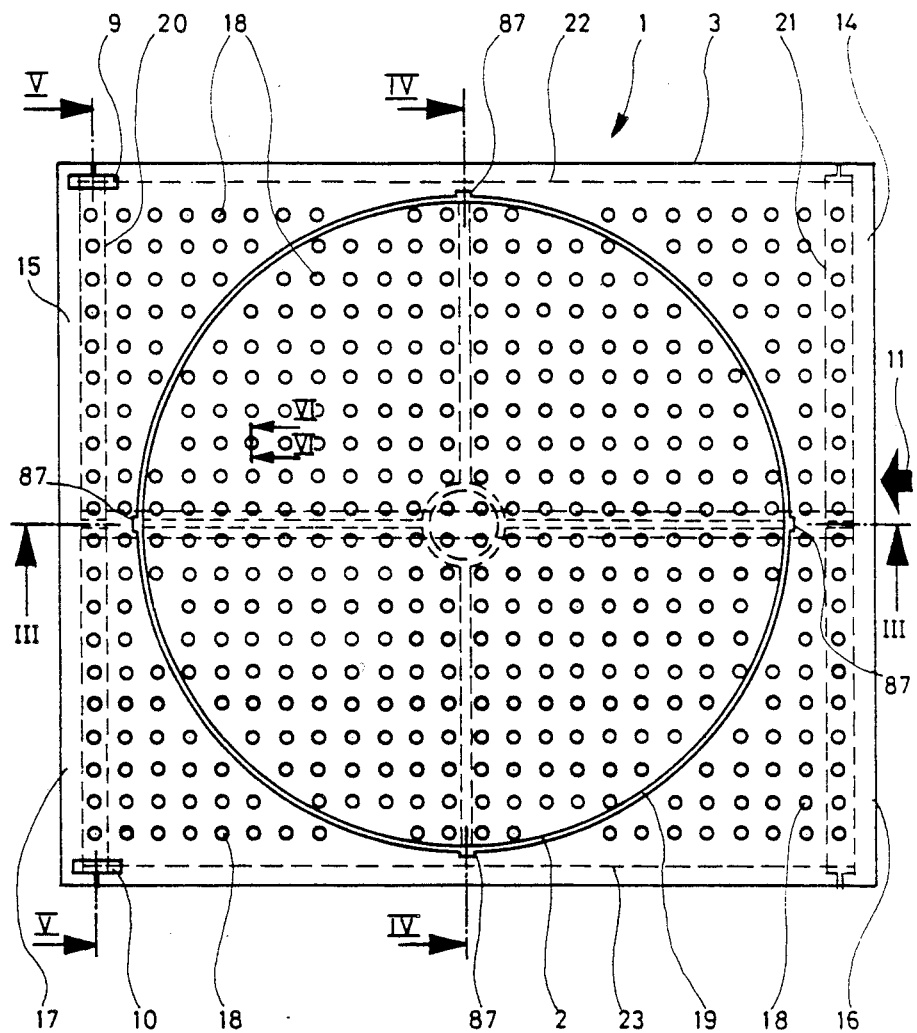
FIG. 2 is a top view of the device of FIG. 1.

The device 1, as illustrated in FIG. 2, will receive the batch of blanks arriving in a direction of arrow 11. The ball carrier table 3 has a rectangular shape and consists of four quadrants 14, 15, 16 and 17, which are connected to one another. These four quadrants 14–17 are provided with housings into which driven ball carriers or carrier balls 18 are inserted to form carrier ball units. The assembly of the four quadrants 14–17 make up a fixed part of the carrier ball table. These quadrants 14–17 surround a turntray or turntable 2, itself equally equipped with driven carrier balls 18 similar to those of the carrier ball tray 3. The quadrants may be composed of two ring-shaped halves for reasons of manufacture and form a circular opening which receives the circular turntray 2, with the opening having a clearance 19 with the circumference of the turntray. In the execution shown in FIG. 2, the control of the turntray is insured by a central axle or shaft 36 (see FIGS. 3 and 4). The carrier balls 18 are driven by two endless belts 22 and 23 which extend between a front twin roller 20 and a rear twin roller 21, with the motion being imparted by the front twin rollers 20. Both endless belts 22 and 23 can be stretched due to movement of the twin rollers 21 relative to the front twin rollers 20.

Figure 2A:
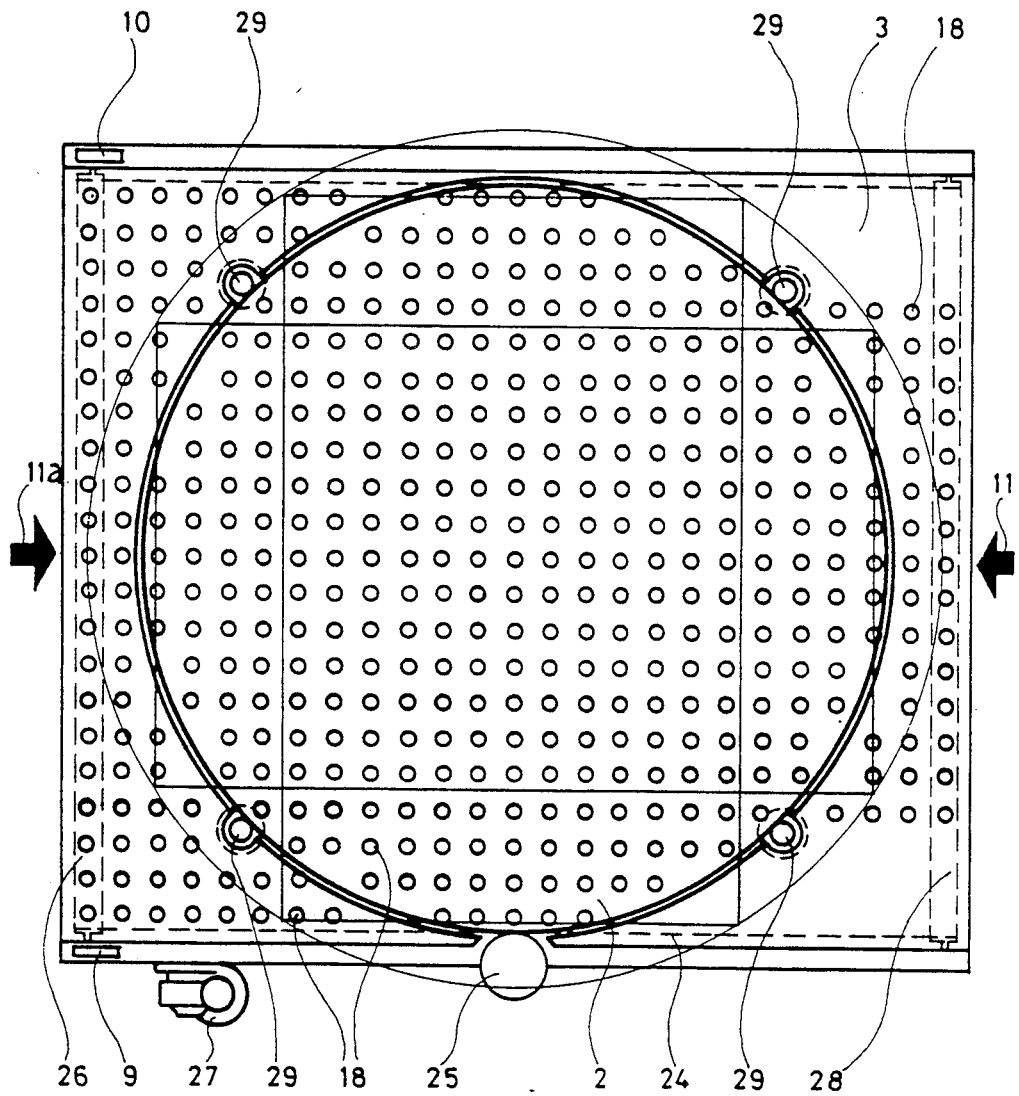
FIG. 2a is a top view of a modification of the device of FIG. 1.

In an embodiment illustrated in FIG. 2a, the object to be processed can be moving in the direction of the arrow 11 or the arrow 11a to arrive on the carrier ball table 3 from where they are directed to the turntable or turntray 2. The motion of the ball carrier 18 on the carrier ball table 3 and on the turntray 2 is insured by a single endless belt 24, which is driven by a front side roller 26 and a rear side roller 28. The front roller 26 is rotated and controlled by a motor with a reduction gear 27. The use of an endless belt 24 is possible because the rotation of the turntray 2 is imparted by a drive roller 25 which is fitted on an axle of a non-represented motor with a reduction gear, which drive roller acts on the circumferential edge of the turntray 2. As in the previous embodiment, movement of the front side roller 26 relative to the rear side roller 27 will maintain the desired tension on the endless belt 24. On the other hand, the turntray 2 is held in the center position by centering rollers 29 fitted along the periphery of the turntray and held within the bearings added to the carrier ball table 3. Obviously it may be imagined that the endless belt might be replaced by any other element for linear shifting and expected to impart its motion to the carrier balls 18. An example of such an element consists of conveyor chains which transport stiff plates which enable processing of heavier piles of objects, such as steel sheets or full pallets loaded with batches of box blanks.

Figure 3:
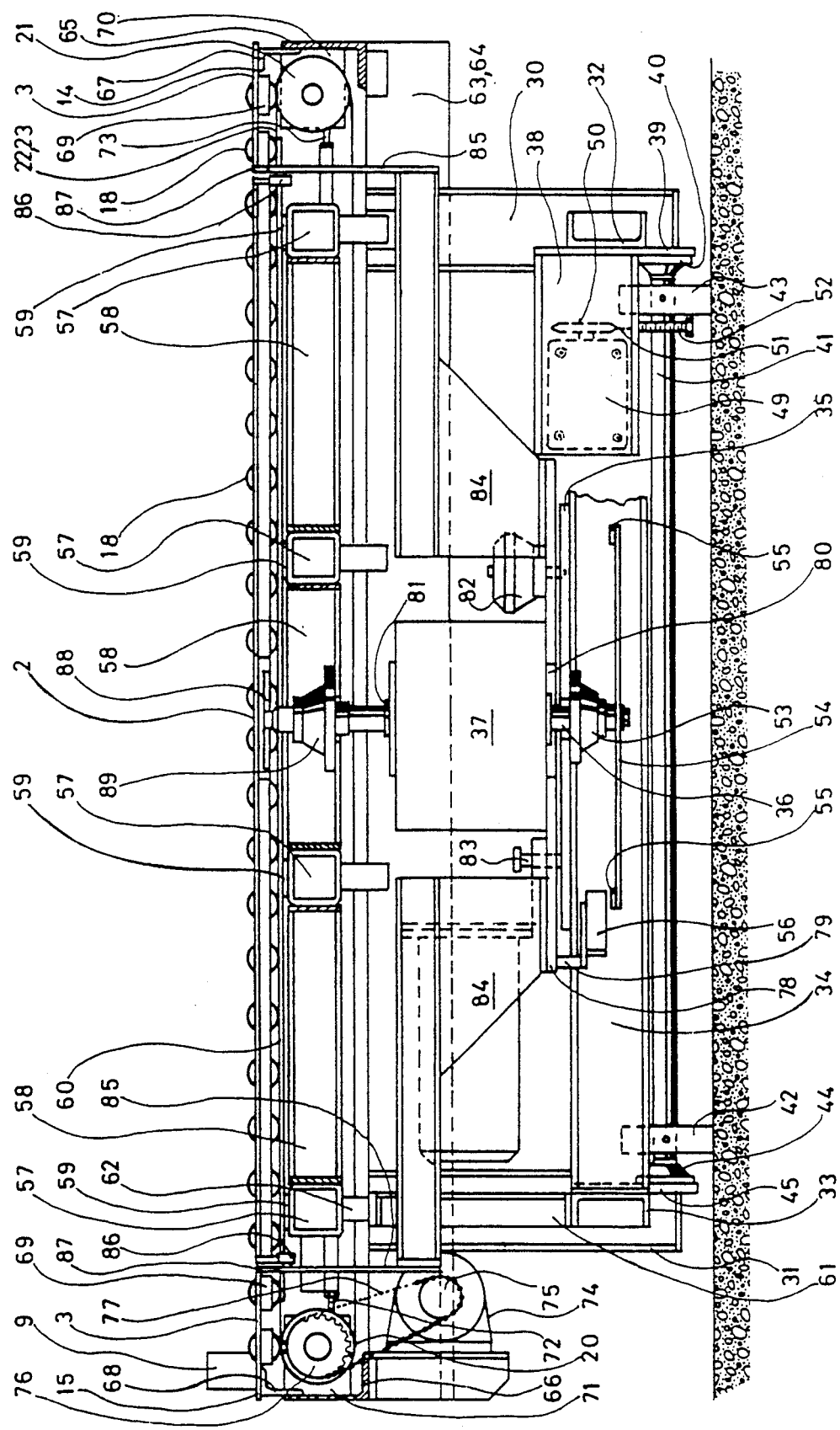
FIG. 3 is a cross sectional view with portions in elevation, taken along the lines III—III of FIG. 2.
Figure 4:
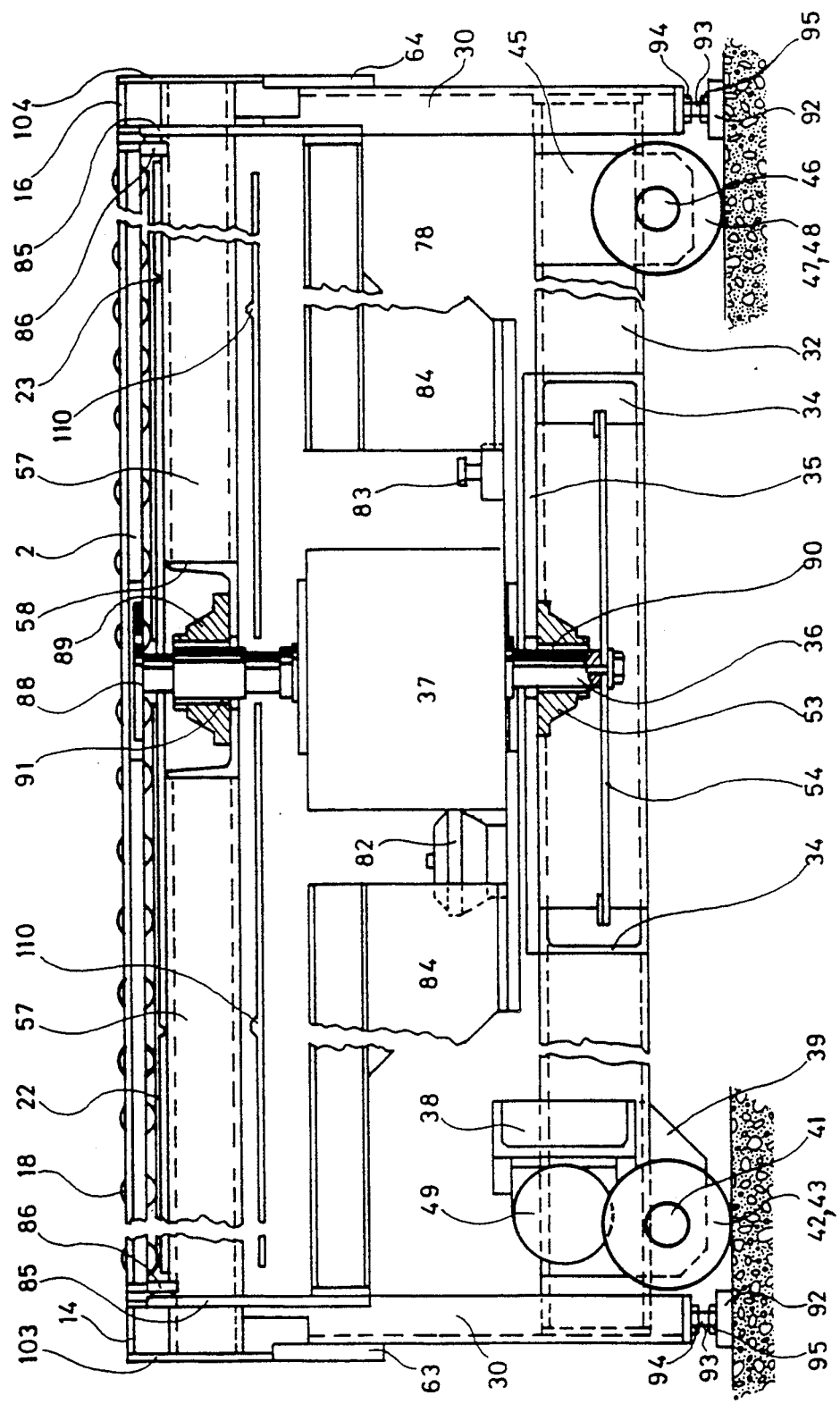
FIG. 4 is a cross sectional view with portions in elevation for purposes of illustration, taken along the lines IV—IV of FIG. 2.

As best illustrated in FIG. 3, the device 1 includes a lower chase consisting of vertical beams 30 and 31 connected to one another by crossbars 32 and 33. The crossbars 32 and 33 are, themselves, connected to struts 34 in such a way as to form a sturdy lower frame on which a supporting plate 35 is fixed, and the plate 35 has its center provided with an opening allowing the installation of a shaft 36 of a motor with a reduction gear 37. As shown on the right of the Figure, a support 38 is fitted against the front side of the two crossbars 32 and 33. This support 38 includes a base plate 39 on which is fitted a bearing 40 which engages one end of an axle 41 designed for supporting rollers 42 and 43 which are required for shifting of the device. The other end of the axle 41 is held by a bearing 44 which is screwed on a supporting plate 45 which, itself, is fitted against the front side of the crossbar 33. Obviously, a simple design is foreseen for holding the other axle 46, the purpose of which is to hold the rollers 47 and 48, which are illustrated in FIG. 4. The shifting of the device is achieved by means of a motor 49 (see FIG. 3), which is mounted on the support 38. The motor 49 has a shaft provided with a sprocket wheel 50 which is connected by means of a chain 51 to another sprocket wheel 52, itself provided on the shaft 41.

The shaft 36 of the motor with the reduction gear 37 engages in a smooth lower bearing 53 which is mounted by threaded fasteners on a lower side of the supporting plate 35 and the end of the shaft 36 protrudes through the bearing 53 and is equipped with a coding device which is a coding disk 54 provided with a block 55 to be spotted by a proximity detector 56 in such a way as to enable a check of the rotation of the motor with the reduction gear 37. As a substitute for this coding device, it would be possible to fit, at the shaft end, a decoder, for instance a pulse generator, which is a well-known device.

The device has a fixed part or upper chase consisting of an assembly of tubular crossbars 57, themselves connected to one another by struts 58. Every tubular crossbar 57 is equipped, on its upper part, with a shim 59 on which a support plate 60 is secured by threaded fasteners. The support plate 60 acts as a supporting plane of the endless belts 22 and 23. The upper chase, on the other hand, is connected to the lower chase by means of vertical beams 61, only one of which is shown on the left side of FIG. 3. This vertical beam 61 is topped by a bar 62 supporting the lower side of the tubular crossbars 57. Two longitudinal beams 63 and 64 are fastened by threaded fasteners on the outer side of the vertical columns 30 and 31 in such a way as to be able to act as an anchorage for the carrier ball table 3, owing to the angle pieces 65 and 66 and to the angle pieces 67 and 68. As indicated above, the carrier ball table 3 consists of four quadrants 14–17 into which the ball bushings 69 are inserted. The angle irons 65 and 66 support, moreover, the bearings 70 and 71 of both the front and rear twin rollers 20 and 21, respectively.

In the execution shown here, the bearings 70 and 71 can be adjusted lengthwise by means of appropriate appliances 72 and 73 thereby allowing the set of the parallelism of the twin rollers 20 and 21 and to exert a certain tension on the two endless belts 22 and 23. The belts 22 and 23 are driven by a motor with a reduction gear 74, whose motion is imparted to the twin rollers 20, which includes a chain 77 which extends between a sprocket gear 75 attached on the shaft of the reduction gear 74 and a sprocket gear 76 attached on the shaft of the twin rollers 20.

The mobile part of the device includes a pad 78 on which the motor with reduction gear 37 is mounted. A proximity detector 56 is also secured on the pad 78 by a strap or block 79. In the execution shown hereinabove, the motor with reduction gear 37 has a tubular center hub in which the shaft 36 of the turntable 2 is cottered or keyed and secured in a vertical position by retaining rings 80 and 81. At least one pneumatic jack 82 is mounted on the upper side of the pad 78 and the push axle or rod of the jack 82 passes through the pad 78 and rests within a bore existing in the support plate 35. The limitations of the vertical stroke of the movable part is obtained by means of stop pieces 83 which are fitted within the supporting plate 35. The appliance has been designed with a view of using one stop piece 83 for each jack 82. The stop pieces are arranged in such a way as to be able to act jointly with the non-represented end switch destined to command the rotary drive of the turntable 2 when making use of the rotation with the tray in an upper position. This function is programmed on the control desk of the device. The pad 78 is, moreover, provided with four arms 84 which support, on their ends, a guiding block 85 equipped with a supporting roller 86 which roller 86 is in contact with the periphery of the lower side of the turntable 2 and which provides a supporting and rolling point. The guide block 85 is engaged within a guiding rail 87 which is machined into the quadrants 14–17 of the carrier ball table 3, as best illustrated in FIG. 2. The turntable 2 is equally equipped for ball bushings or guide members 69, similar to those of the carrier ball table 3 (see FIG. 3). The center of the turntray 2 is provided with a sleeve 88 fitted at the upper end of the shaft 36, which is guided in that area within an upper smooth bearing 89, which is fitted against the lower side of a strut 58 in the center of the upper chase. In FIG. 3, the turntable 2 is shown in the lower position, i.e. in a position enabling the lower part of the carrier balls 18 to be in contact with the upper surface of the upper run of the two endless belts 22 and 23.

It is obvious that the lifting system described hereinabove represents one example for accomplishing the lifting of the turntray. It can also be accomplished by utilizing a motor with a reduction gear provided with a helically grooved central bushing within which the shaft would rotate and rise for raising the turntable. Another example of an arrangement would be to use a jack or piston and cylinder arrangement acting on a lower end of the shaft of the turntray and acting through a thrust ball bearing. Other possibilities for angular drives and for raising the turntable are obviously envisioned, for instance, gears, toothed belts for rotation and cams for the raising action.

In FIG. 4, it is possible to see the details of the smooth bearings 53 and 89, which enable, with the help of the bushings 90 and 91, a vertical shifting of the shaft 36 that supports the turntray 2. It may be noticed that the endless belts 22 and 23 are provided with a centering rib 110, which provides an easier lengthwise guiding of the belt. With a view of securing the position of the device after having shifted it to its operating area, both vertical columns 30 and 31 have been equipped with the supporting elements consisting of a cup or pad 92, a threaded rod 93, a nut 94 and a counter or lock nut 95.

Figure 5:
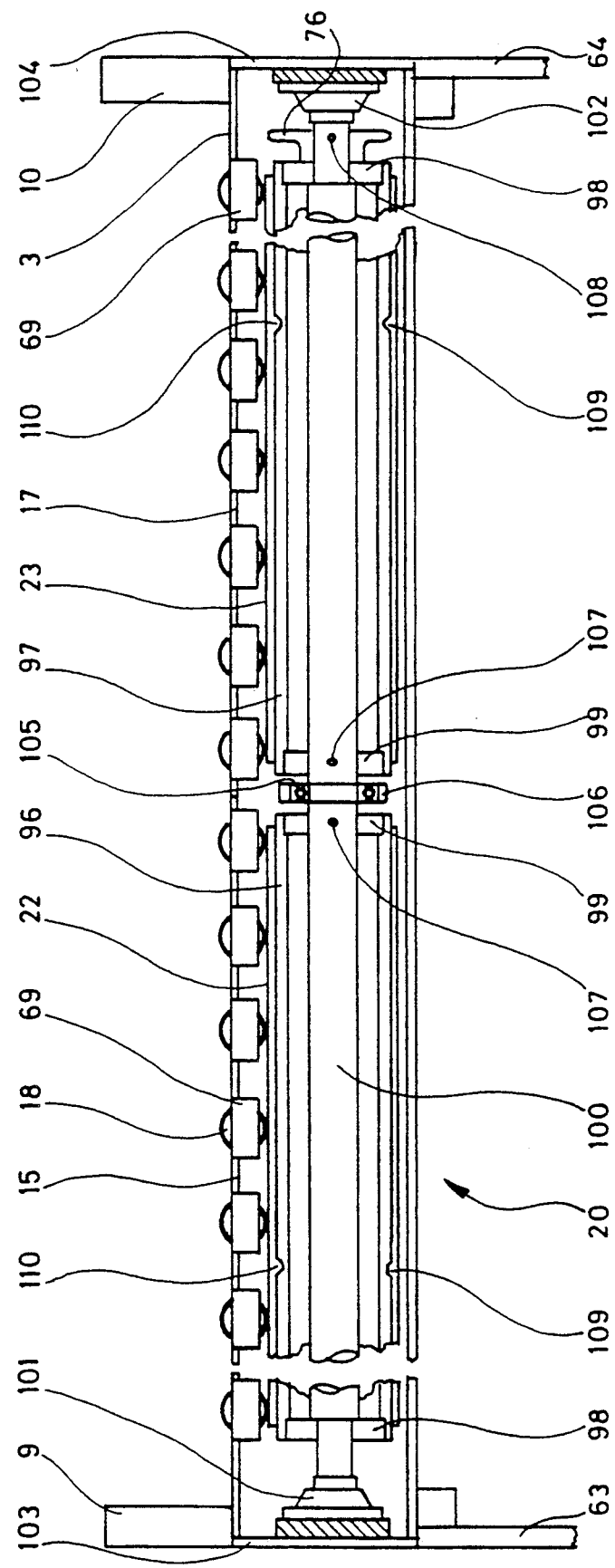
FIG. 5 is a cross sectional view with portions in elevation for purposes of illustration, taken along the lines V—V of FIG. 2.

As illustrated in FIG. 5, the front twin rollers 20 consist of two cylindrical sleeves 96 and 97, which are closed at each end by caps 98 and 99, which have bores that make it possible for the rollers to be mounted on a drive shaft 100. The shaft 100 is supported at both ends by bearings 101 and 102, which bearings are secured on side guides, such as 103 and 104, which guides are permanently fitted on the longitudinal beams 63 and 64. In addition, the drive shaft 100 is supported at its center by a ball bearing 105 arranged within a support 106. The lateral position of the assembly consisting of the cylindrical sleeves 96 and 97 and of the caps 98 and 99 is secured by a pin 107, which crosses through the caps 98 and 99 and through the drive shaft 100, which arrangement enables the rotary drive of the front twin rollers 20. As already pointed out above, this drive motion is obtained by means of a motor with a reduction gear 74 equipped with a sprocket wheel 75, itself connected to the sprocket wheel 76 by means of a chain 77. The sprocket wheel 76 is secured with a pin 108 on the end of the drive shaft 100 opposite the bearing 102. The cylindrical sleeves 96 and 97 have, moreover, a groove 109 for receiving the rib 110 of both endless belts 22 and 23. This illustration also shows the two quadrants 15 and 17 of the center ball table 3, as well as the photoelectric cell mounts 9 and 10. The ball bushings 69 carrying the carrier balls 18 are situated within their respective quadrants and in the area of the carrier ball table 3, the carrier balls 18 are always in contact with the upper surface of the endless belts 22 and 23.

Figure 6:
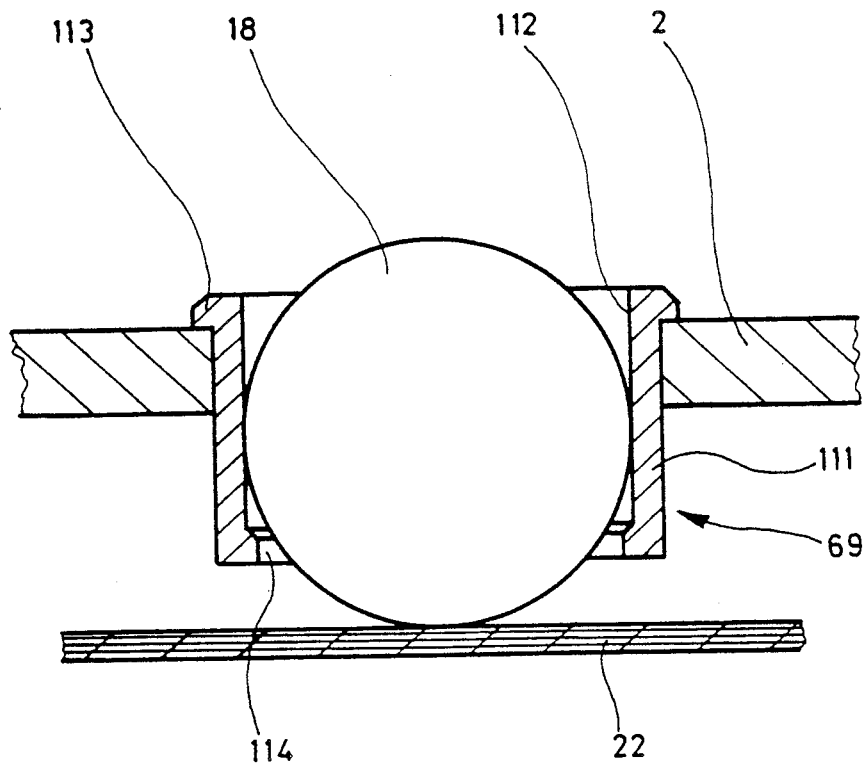
FIG. 6 is a cross sectional view with portions in elevation for purposes of illustration taken along the lines VI—VI of FIG. 2.

In FIG. 6, a sectional view of a ball bushing 69 is illustrated. As shown, the bushing 69 is fitted within the turntray 2 and the endless belt 22 is actually the one on which the carrier ball 18 is to press. The ball bushing 69 has the shape of a tube-like cylindrical body 111 with a bore 112 dimensioned so that the carrier ball 18 may move freely therein. Thus, the ball 18 is able to indifferently rotate around its own axis and shift vertically within the bore 112. The tubular, cylindrical body 111 has, in its upper section, a collar 113 used for fixing the vertical position when it is inserted into the turntray 2. In the lower part of the bore 112, a chamfered choke or shoulder 114 is provided and this shoulder provides a seat for the carrier ball 18 when the turntray is in its upper position In this way, as this position is obtained, the carrier ball 18 will come to rest on the seat and its upper part will be situated at a level immediately underneath the upper surface of the collar 113. Because the raising stroke of the turntray 2 is longer than the vertical movement which the carrier ball 18 is able to accomplish in the bore 112, there will no longer be a contact between the lower part of the carrier ball 18 and the upper surface of the endless belt 22 or any contact between the upper surface of the ball 18 and an object resting on the turntray 2. At this stage, the object lying on the turntray will no longer be in contact with the carrier ball 18, but rest on a plane determined by the upper part of the collar 113.

It should be remembered that the transfer and orientation device 1 is provided for processing batches of sheets stacked on one another and originating from a processing machine, for example a press for die-cutting sheets of corrugated board. The sheets processed by the cutting press include, generally, severally blanks, each representing a future folded box, which are attached one to another along coextensive sides by nicks and are stacked in a delivery station of the cutting press. This pile of sheets is, thus, not immediately usable, for instance on a machine for folding the box blanks, until a separation of the individual blanks of each sheet from each other is accomplished by means of a so-called separator.

As a rule and depending on the arrangement of the various blanks within the sheet area, it will be necessary to impart another direction to the sheet pile coming out of the first conveyor from the delivery station of the cutting press before it can be directed into the separator. To achieve this change of direction, the transfer and orientation device 1 is used in the following manner:

The sheet pile leaving the cutting press is moved onto a device by means of a conveyor with photoelectric cells detecting the front and rear edges of the pile. In the initial phase, the photoelectric cells detect the front edge of the sheet pile arriving at the device 1 and cause a starting up of the single belt or the pair of belts of the transfer and orientation device 1 and, thereby, start the rotation of the carrier balls 18. The detection of the pile front edge by the above-mentioned photoelectric cell also results in the starting of a circuit used for counting pulses which originate from a pulse generator situated on the conveyor outlet roller. The distance through which the sheet or pile of sheets is to be shifted before reaching a geometric center of the turntray 2 corresponds to a certain number of pulses. The number of pulses will depend on the dimensions of the pile in the running direction. The photoelectric cells are, moreover, to detect the sheet pile rear edge in such a way as to enable correct computing of the number of pulses. The required number of pulses obtained will assure that the pile of sheets is properly centered on the turntable 2 and that the driving motion of the conveyor, either using the two belts 22 and 23 or the single belt 24, will be interrupted. With the interruption of the belts, rotation of the carrier balls 18 will be stopped. In the case of a sheet pile with a size contained within the circumference of the turntray 2, the tray will be immediately rotated through an angle of 45° resulting in the pivoting of the batch through 90° under the action of the relative motion of the carrier balls 18 and of the movement of the tray 2. In the event the size of the sheet exceeds the circumference of the tray, the turntray will be raised when the belt of the conveyor has been brought to a standstill and, then, immediately rotated through an angle of 90°, since the carrier balls 18 are no longer of any use in causing the rotation because they are no longer in contact with belt or with the lower side of the pile disposed on the tray.

The two above-mentioned operation modes can be selected by means of a switch located on a control desk for the device.

In the first case, the angular range of rotation of the turntray 2 is controlled by a coding device, such as the coding disk 54 which is arranged at the end of the shaft 36 of the turntray 2. With the rotation accomplished, the endless belts will then start up anew with the carrier balls 18 being rotated, which action will cause the pile of sheets to be advanced towards the separator after having been rotated through 90° around an axis extending perpendicular to the plane of the table. In order to make sure that the separation takes place within the separator and that no pile of processed sheets will be in it, two photoelectric cells 9 and 10 are fitted at the outlet end of the transfer and orientating device 1. If these cells detect the rear edge of a pile in the course of the separation, they will transmit a signal to the control appliance of the endless belts 22 and 23 in order to prevent them from moving until the rear edge of the previous pile ceases to be blocking the light beam aimed at the photoelectric cells. As soon as the photoelectric cells are no longer darkened, the conveyor situated at the delivery of the cutting press will receive an order to start up again, whereupon the operation cycle will commence anew.

In the second case mentioned above, the turntray 2 will have descended to its lower position and the end switch of the end stop 83 will be actuated as soon as the turntray has accomplished its rotation through 90°, in other words when the coding device has checked the amount of rotation. This will result in causing the endless belts 22 and 23 to start up and to start rotating the balls 18 in such a way as to have the pile of sheets advance toward the photoelectric cells 9 and 10, which will then operate in the same manner as in the first case.

The comments given above are a description of how the transfer and orientating device operates when it is integrated into a particular configuration of a production line. However, the device 1 of the invention may be used in numerous other ways. In fact, on account of the particular drive system of the carrier balls 18 on the carrier ball table 3 and of the turntray 2, it may be imagined, in the event of piles contained within the circumference of the turntray, that the rotation of the small pile on the tray and the shifting of the endless belts 22 could be timed in such a way that piles of sheets, for instance already separated batchwise, will be supplied to a machine, for instance a palletizer, depending on the various locations across the device and, thus, allows for obtaining layers of batches situated one beside the other. Apart from the advantage of the multiple usability, the device, owing to the joint action of the rotation of the turntable 2 and the carrier balls 18 will allow for considerable reduction in the time required for the turning of the sheet pile around the axis, since, as explained above, a pile rotated through 90° will only necessitate a rotation of the turntable 2 by 45°.

Although various minor modifications may be suggested by those versed in the art, it should be understood that I wish to embody within the scope of the patent granted hereon all such modifications as reasonably and properly come within the scope of my contribution to the art.

I claim:

1. A device for transferring and orientating batches of flat objects, especially stacks of cardboard and corrugated blanks, said device including means forming a transferring and orientation plane including a carrier ball table having a plurality of spaced carrier ball units mounted thereon and forming an opening receiving a turntray having a plurality of carrier ball units mounted thereon, means for mounting said turntray in said opening and enabling rotation around an axis extending at right angles to said transfer and orientation plane and including means for supporting the turntray in said plane, means for rotating said turntray, means for shifting the turntray between a first lower position in the transfer and orientation plane and a second raised position disposed above said plane, said means for shifting consisting of at least one jack acting between a lower frame of said table and a member attached to said turntray, each of said carrier ball units of said carrier ball table and turntray being a ball loosely received in a guiding member mounted in the table and turntray, respectively, and means for driving said balls of said carrier ball units consisting of at least one linearly shifting member having an upper surface, said member being disposed below the transfer and orientation plane with the upper surface being in permanent contact with a lower part of each of the balls of the units belonging to said carrier ball table, as well as with a lower part of the balls of the units belonging to said turntray when said turntray is in said first position.

2. A device according to claim 1, wherein the means for mounting the turntray includes a lower smooth bearing and an upper smooth bearing receiving an axle of said turntray.

3. A device according to claim 2, wherein the means for rotating the turntray includes a motor with a reduction gear being fitted to said axle between said upper and lower smooth bearings.

4. A device according to claim 1, wherein the means for supporting the turntray for rotation includes guide blocks secured adjacent the lower surface of said table having supporting rollers operatively engaging a lower peripheral surface of said turntray.

5. A device according to claim 1, wherein the means for rotating the turntable include a motor with a reduction gear having an axle, a drive roller being connected to said axle and engaging a circumferential edge of the turntray.

6. A device according to claim 1, wherein said at least one linearly shifting member comprises at least one endless belt extending between a front and rear roller with an upper run engaging said balls and a support plate disposed beneath said upper run to support said upper run as it engages said balls.

7. A device according to claim 1, wherein said at least one linearly shifting member consists of two endless belts arranged side-by-side and moving between front and rear twin rollers with an upper run engaging said balls and a support plate being disposed beneath the upper run of said belts for supporting said upper runs as they engage their respective balls.

8. A device according to claim 1, wherein each of the guide members of the carrier ball units is a hollow cylindrical body having a bore for receiving the ball, said cylindrical body being provided on its upper part with a collar and said bore having its lower part provided with an inwardly extending shoulder to form a seat for receiving the ball.

* * * * *